Figure 3:
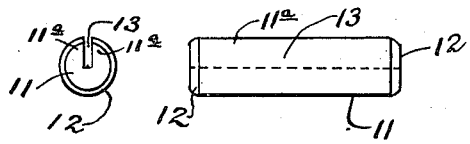

B. P. HALL.
DOWEL PIN.
APPLICATION FILED MAR. 5, 1918.

1,287,678.

Patented Dec. 17, 1918.

Inventor
BURTON P. HALL
By his Attorney
Israel Benjamins.

UNITED STATES PATENT OFFICE.

BURTON P. HALL, OF FANWOOD, NEW JERSEY.

DOWEL-PIN.

1,287,678.

Specification of Letters Patent.

Patented Dec. 17, 1918.

Application filed March 5, 1918. Serial No. 220,623.

*To all whom it may concern:*

Be it known that I, BURTON P. HALL, a citizen of the United States, residing at Fanwood, in the county of Union and State of New Jersey, have invented a new and useful Dowel-Pin for Use in Carpentry, Joinery, Ship-Building, and Similar Arts, of which the following is a specification.

My invention consists in the novel features hereinafter more fully described.

The objects of my improvement are:

First, to produce a dowel pin, which will not get loose in the corresponding opening or dowel hole, which is made to receive it.

Second, to have said improved dowel pin simple, durable and inexpensive.

I attain these objects by the dowel pin, one form of which is illustrated in the accompanying drawings, or by any mechanical equivalent or obvious modification of the same.

In the drawings Figure 1 is an end view of the preferred form of my improved dowel pin; Fig. 2 is a side elevation of the same; Fig. 3 is an end view of a piece of timber, showing two of my improved dowel pins in position in the corresponding openings or dowel holes in said timber.

Similar numerals and letters refer to similar parts throughout the several views.

11 designates the dowel pin, which is shown in Fig. 2 as having its ends 12 rounded off for facilitating the driving of said dowel pin into a hole which is of a somewhat smaller diameter.

The dowel pin 11 is provided with a groove 13, which extends lengthwise from end to end of said pin and reaches in depth nearly to the axis of said pin.

The considerable depth of said groove 13 allows the portions 11$^a$ of said pin 11 an appreciable amount of deflection or spring, which enables the pin to be driven tight into an opening in the timber 14, which is somewhat smaller in diameter than said pin, and it also tends to keep the pin in position in said opening after it is driven in.

The sides of said groove 13 may be made parallel to begin with, as shown in Fig. 1; after the pin 11 is driven home, the portions 11$^a$ of said pin will converge at their ends, and the groove 13 will assume the shape shown in Fig. 3.

Many changes could be made in my improved dowel pin without departing from the main scope of my invention; I do not, therefore, restrict myself to the exact form of my dowel pin as shown in the drawings; but I intend to include also all mechanical equivalents and reasonably obvious modifications of the same.

What I claim as my invention, and desire to secure by Letters Patent is:

1. A substantially solid dowel pin of suitable material having formed therein a longitudinal groove extending from end to end thereof and adapted to allow the portions of said pin adjacent thereto to be sprung, thereby enabling said pin to be driven into a dowel hole of a somewhat smaller diameter than said pin and to be kept securely in position in said dowel hole.

2. A substantially solid dowel pin of suitable material having formed therein a longitudinal groove, reaching substantially to the axis of said pin, said groove being adapted to allow the portions of said pin adjacent thereto a considerable amount of spring, thereby enabling said pin to be driven into a dowel hole of a somewhat smaller diameter than said pin, and to be kept securely in position in said dowel hole.

BURTON P. HALL.